United States Patent Office 3,584,082
Patented June 8, 1971

3,584,082
PHOSPHITE-OXIDIZED $C_2$ TO $C_4$ POLYMER ORGANOPHOSPHORUS PRODUCT
Charles J. Korpics, Oak Lawn, and Walter C. Edmisten, Olympia Fields, Ill., and George S. Culbertson, Whiting, Ind., assignors to Standard Oil Company, Chicago, Ill.
No Drawing. Filed June 3, 1968, Ser. No. 733,797
Int. Cl. C10m 1/46; C07f 9/02
U.S. Cl. 260—921                                  4 Claims

ABSTRACT OF THE DISCLOSURE

Organophosphorus products of the reaction of one mol of diethyl phosphite and about 0.5–2 mols of an oxidized polymer obtained by treating a $C_{2-4}$ polymer, having a molecular weight of about 250–5000, with air in the presence of a catalytic amount of manganous carbonate at about 130–180° C. for about 20–60 hours, are useful as ashless wear inhibitors in lubricating oil compositions.

BACKGROUND OF THE INVENTION

Wear inhibitors for incorporation in motor oils and industrial oils are finding greater usage as a result of greater stress placed on moving parts in high performance engines. Anti-wear agents are intended to decrease wear of machine parts. In the past, the majority of anti-wear agents were metal compounds. These have not been found entirely satisfactory due to the fact that upon decomposition these compounds leave a metal ash as a contaminant. The need has therefore arisen for anti-wear agents leaving no ash and which are capable of effectively reducing the wear of metal parts.

SUMMARY OF THE INVENTION

We have now discovered a new composition of matter useful as an ashless wear inhibitor. Broadly the composition of the present invention is prepared by the process of reacting a carbonyl-containing $C_2$–$C_4$ polymer with dialkyl phosphites, preferably diethyl phosphite. This composition may be used in concentrations of from 0.1 to 5.0 percent in motor oil formulations and industrial oil formulations. Furthermore, this composition may be used with the other additives employed in such formulations.

The carbonyl-containing $C_2$–$C_4$ polymer may be prepared by oxidation of polybutenes, polypropylenes, polyethylenes, and copolymers thereof. Polymers in the molecular weight range of from 250 to 5000 are suitable, however, a preferred molecular weight range is from 400 to 2000. The ketones of these polymers are preferred. It is also preferred that the carbonyl compounds be prepared by the air oxidation of the polymer in the presence of a catalyst, for example, manganous carbonate. It may also be advantageous for the reaction with diethyl phosphite to proceed in the presence of a catalyst, for example, sodium methoxide.

In the preferred embodiment it is desired that the oxidation of the polymer be carried out at a temperature in the range of 130 to 180° C. for about 20 to 60 hours, preferably at 150–155° C. for 48 hours. Vigorous stirring is essential. The reaction mixture may then be filtered and stripped. Stripping with nitrogen is preferred.

The addition of diethyl phosphite is advantageously carried out at a temperature in the range of 70 to 110° C.; preferably about 80° C. The mole ratio of the carbonyl-containing polymer to diethyl phosphite may be in the range of from 0.5:1.0 to 2.0:1.0, preferably about 1:1. After addition of the diethyl phosphite to the carbonyl-containing polymer, heating is continued for a period of from 16 to 36 hours at 100 to 125° C., preferably at 110–115° C. for 24 hours. The final product may then be stripped and filtered.

DESCRIPTION OF PREFERRED EMBODIMENT

EXAMPLE I

Twenty-five hundred grams of a polybutene (mol. wt. 425), commercially referred to as cable oil #50, was placed into a 5 l. three-neck flask fitted with a stirrer, a condenser system which includes a Dean-Stark separator for collection of light end by-products and a sintered glass diffusion tube connected to a metering device for admittance of measured quantities of air. Seventeen grams of powdered manganous carbonate catalyst was added and air was blown in at a rate of 3 c.f.h. The reaction mixture was heated to 150–155° C. and maintained at that temperature for 48 hours, with vigorous stirring. Throughout the duration of the reaction the light end by-products were collected. The volume of this two-phase system served as a measure of the rate of reaction. The red-brown reaction mixture was filtered through Celite and then returned to a flask suitable for stripping with a nitrogen stream. Stripping involved blowing of nitrogen at 3 c.f.h. into the product which was heated to 150–155° C., for four hours. Analyses of batches of oxidized cable oil #50, oxidized polypropylene (M.W. 478), and oxidized ethylene-propylene copolymer (M.W. 2000), prepared in the above manner, are listed below.

TABLE I

|  |  | IR analysis | | | | |
|---|---|---|---|---|---|---|
|  |  | Percent | | OH content [1] | G. C/l. sample | Mol. $\overset{O}{\overset{\|}{C}}$/mol. |
|  | Mol. wt. | $O_2$ | Activity |  |  |  |
| Additive: Cable Oil #50: |  |  |  |  |  |  |
| Ia | 513 | 8.3 | 88 | 28 | 33 | 0.66 |
| Ib | 502 | 8.4 | 87 | 30 | 23 | 0.66 |
| Polypropylene: Ic | 657 | 7.2 | 80 | 50 | 51 | 1.3 |
| Ethylene-propylene copolymer: Id | 1,823 | 5.2 |  | 80 | 62 |  |

[1] Absorbance/cm. at 2.9 μ.

EXAMPLE II

A number of batches of oxidized cable oil #50 were prepared using a 4 c.f.h. air input. Corresponding increases in oxygen and carbonyl content were obtained.

EXAMPLE III

Seven hundred and seventy-five grams of oxidized cable oil #50 (1.0 mol carbonyl) were added to a 2 l. three-neck flask fitted with a thermometer, stirrer and condenser. Diethyl phosphite (145 g., 1.0 mol+5% excess) was added. After heating the reaction mixture to 80° C., 14 ml. of a sodium methoxide solution (5 g. sodium methoxide in 20 ml. methanol) were slowly added. The methanol was allowed to strip off while the reaction temperature was raised to 110–115° C. and maintained for 24 hours. The final product was obtained by stripping under vacuum (5 to 10 mm.) to a 90° C. head temperature and filtering through Celite.

TABLE II

Bench test results comparing motor oil formulations containing 1% additive and 1.5% of commercial oxidation inhibitor follows. The tests used were the Falex and Shell 4-ball wear tests and are performed as follows: A Falex standard instrument was used for determining the minimum torque for seizure to occur. A Shell 4-ball wear instrument was run for 2 hours at 40 kg. load at 1200 r.p.m. and the wear scar was measured in millimeters by a microscope. Torque loads of over 3000 lbs. are desirable in the Falex and wear scars in the Shell 4-ball test are wanted as low as possible.

|  | Oxidized polymer source | NaOMe catalyst | Percent P | Falex torque load | Shell 4-ball, mm. |
|---|---|---|---|---|---|
| Additive: |  |  |  |  |  |
| IIIa | Ia | Yes | 1.07 | 3,750 | 0.38 |
| IIIb | Ia | No | 1.65 | 3,000 | 0.38 |
| IIIc | Ib | Yes | 1.21 | 4,000 | 0.37 |
| IIId | Ib | No | 1.54 | 3,750 | 0.36 |
| Blank |  |  |  | 2,250 | 0.46 |

EXAMPLE IV

Hydroxy phosphonate derivatives of oxidized polybutenes of 250 and 2000 molecular weight, cable oil #50, polypropylene (M.W. 478) and an ethylene-propylene copolymer (M.W. 2000) were prepared.

TABLE III

Representative bench test results of motor oil formulations containing 1% additive prepared by Example IV, and 0.5% of the oxidation inhibitor used in Table II are listed below. For comparison, bench test results of similar blends containing 1% commercial wear inhibitor, and a blank wherein only the phosphonate had been withheld, are also listed.

|  | Oxidized polymer source | Falex | Shell 4-ball |
|---|---|---|---|
| Additive: |  |  |  |
| Commercial wear Inhibitor. |  | 2,750 | 0.51 |
| Blank |  | 2,250 | 0.46 |
| IVa | Polybutene (M.W. 250) | 2,000 | 0.43 |
| IVb | Cable oil #50 | 4,000 | 0.37 |
| IVc | Polybutene (M.W. 2,000) | 3,500 |  |
| IVd | Polypropylene | 2,250 | 0.44 |
| IVe | Ethylene-propylene copolymer | 3,500 | 0.43 |

TABLE IV

Engine test results of motor oil formulations of the ashless hydroxy phosphonate of oxidized cable oil #50 were compared with a blend containing 1% of the commercial wear inhibitor used in Table III and a blank containing 0.75% of the commercial oxidation inhibitor used in Table II. The tests used were the L-38 bearing corrosion-oxidation engine test (ASTM Federal Test Standard No. 3405) and the Oldsmobile MS Sequence I engine test which is accepted by the automotive manufacturers as an engine test measuring wear of a motor oil. Acceptable L-38 and Sequence I engine test results are a maximum of 50 for the L-38 test, and 0.0040 and 0.0060 for the average and maximum wear, respectively in the Sequence I test.

|  | Additive | ASTM Federal Test Standard No. 3405, L-38 Test (mg. wt. loss) | Oldsmobile MS sequence I wear test cam and lifter wear, inch | |
|---|---|---|---|---|
|  |  |  | Avg. | Max. |
| Blend: |  |  |  |  |
| A | Hydroxy phosphonate | 38 | 0.0004 | 0.0007 |
| B | Oxidation inhibitor | 17 | 0.0012 | 0.0018 |
| C | Wear inhibitor |  | 0.0019 | 0.0059 |

We claim:
1. The organophosphorus product of the process comprising reacting (A) diethyl phosphite and (B) about 0.5–2 mols of an oxidized polymer per mol of (A), in the presence of a catalytic amount of sodium methoxide at a temperature of about 100–125° C. for about 16–36 hours; said reactant (B) obtained by the process comprising oxidizing a $C_{2-4}$ polymer, having a molecular weight of about 250–5000, with air in the presence of a catalytic amount of manganous carbonate at a temperature of about 130–180° C. for about 20–60 hours.
2. The product of claim 1 wherein said polymer is a polypropylene.
3. The product of claim 1 wherein said polymer is polybutene.
4. The product of claim 1 wherein said polymer is a copolymer of ethylene and propylene.

References Cited

UNITED STATES PATENTS

| 2,863,834 | 6/1956 | Buckmann | 260—970X |
| 2,934,555 | 12/1957 | O'Brien et al. | 260—970X |
| 3,158,640 | 2/1961 | Le Suer | 260—970X |

CHARLES B. PARKER, Primary Examiner

D. R. PHILLIPS, Assistant Examiner

U.S. Cl. X.R.

252—49.8; 260—970